United States Patent
Herrmann et al.

(10) Patent No.: US 6,631,958 B1
(45) Date of Patent: Oct. 14, 2003

(54) CHILD SEAT FIXING DEVICE

(75) Inventors: Manfred Herrmann, Kaiserlautern (DE); Ralf Liedhegener, Trippstadt (DE); Peter Reimer, Grosskarlbach (DE); Heiko Utsch, Kaiserlautern (DE); Michael Wagner, St. Ingbert (DE); Bodo Zirnstein, Kaiserlautern (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 09/763,587

(22) PCT Filed: Apr. 22, 2000

(86) PCT No.: PCT/EP00/03668

§ 371 (c)(1),
(2), (4) Date: Feb. 22, 2001

(87) PCT Pub. No.: WO01/00436

PCT Pub. Date: Jan. 4, 2001

(30) Foreign Application Priority Data

Jun. 24, 1999 (DE) .......................................... 199 28 862

(51) Int. Cl.$^7$ ................................................ A47C 15/00
(52) U.S. Cl. ................................ 297/463.1; 297/463.2; 297/253
(58) Field of Search ............................ 297/253, 250.1, 297/463.1, 463.2

(56) References Cited

U.S. PATENT DOCUMENTS 5,695,243 A * 12/1997 Anthony et al. ......... 297/250.1
5,918,934 A    7/1999 Siegrist
5,941,601 A    8/1999 Scott et al.
5,979,982 A * 11/1999 Nakagawa ............... 297/250.1
6,152,525 A * 11/2000 Carine et al. ........... 297/216.11
6,196,628 B1 *  3/2001 Goy et al. ................ 297/253
6,334,649 B1 *  1/2002 Boegge et al. .......... 297/250.1
6,390,560 B1 *  5/2002 Gandhi et al. ........... 297/463.1

FOREIGN PATENT DOCUMENTS

| DE | 197 38 802 C1 | 10/1998 | |
| DE | 19738802 C1 * | 10/1998 | ............ B60N/2/28 |
| DE | 198 22 134 C1 | 2/1999 | |
| DE | 19822134 C1 * | 2/1999 | ............ B60N/2/28 |
| DE | 198 34 847 C1 | 10/1999 | |
| DE | 198 27 057 A1 | 12/1999 | |
| DE | 198 50 255 C1 | 6/2000 | |
| EP | 0 901 935 A3 | 3/1999 | |
| EP | 0 976 607 A1 | 2/2000 | |
| JP | 05254367 * | 10/1993 | ................. 297/253 |
| WO | WO 9965729 A | 12/1999 | |

* cited by examiner

Primary Examiner—Peter M. Cuomo
Assistant Examiner—Stephanie Harris
(74) Attorney, Agent, or Firm—Alston & Bird LLP

(57) ABSTRACT

In a fastening device (101) for a child's seat on a vehicle seat, in particular on a motor-vehicle seat, having at least one fastening element (109) which can be moved between an operational position and a parking position and which can be secured in the operational position, an interlocking element (113) is provided which locks the fastening element (109) in the operational position.

24 Claims, 8 Drawing Sheets

Figure 1:
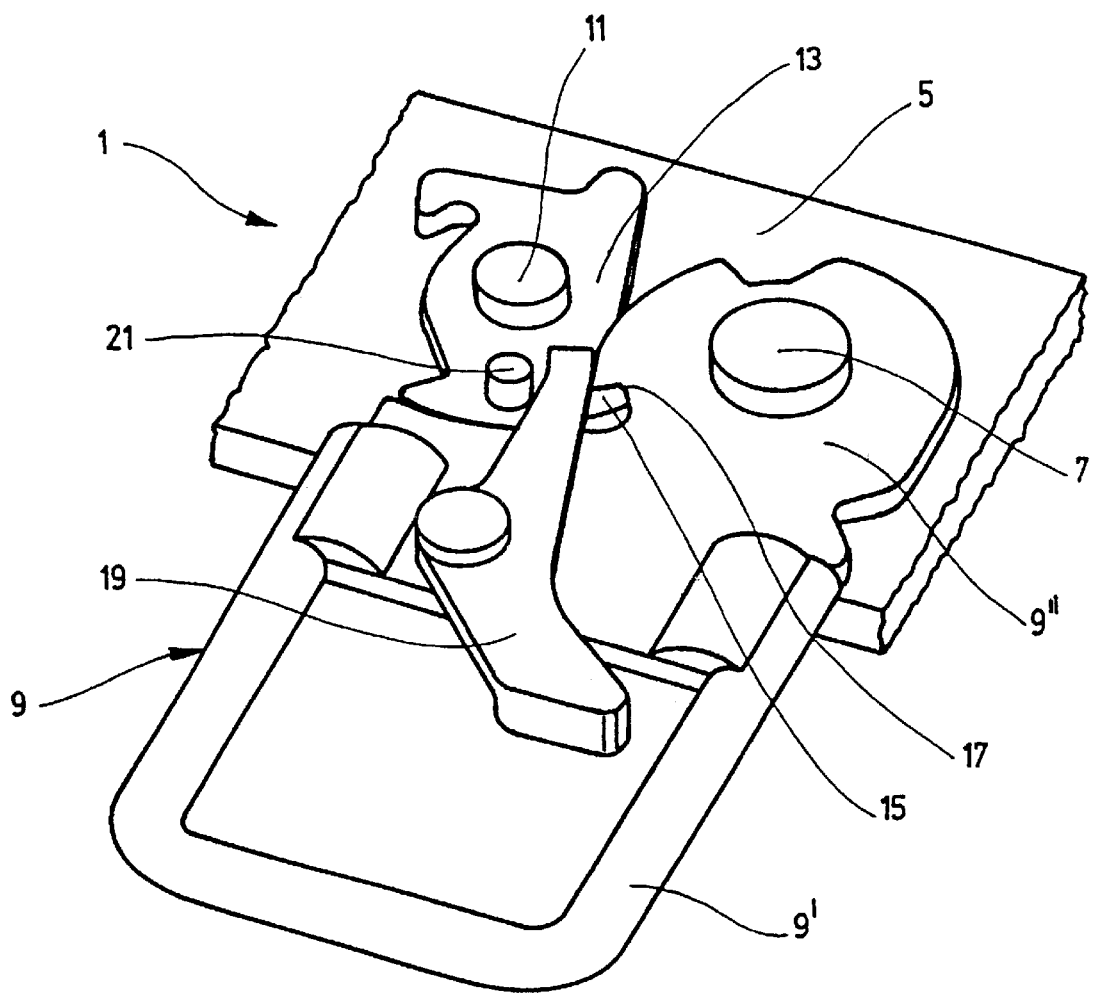

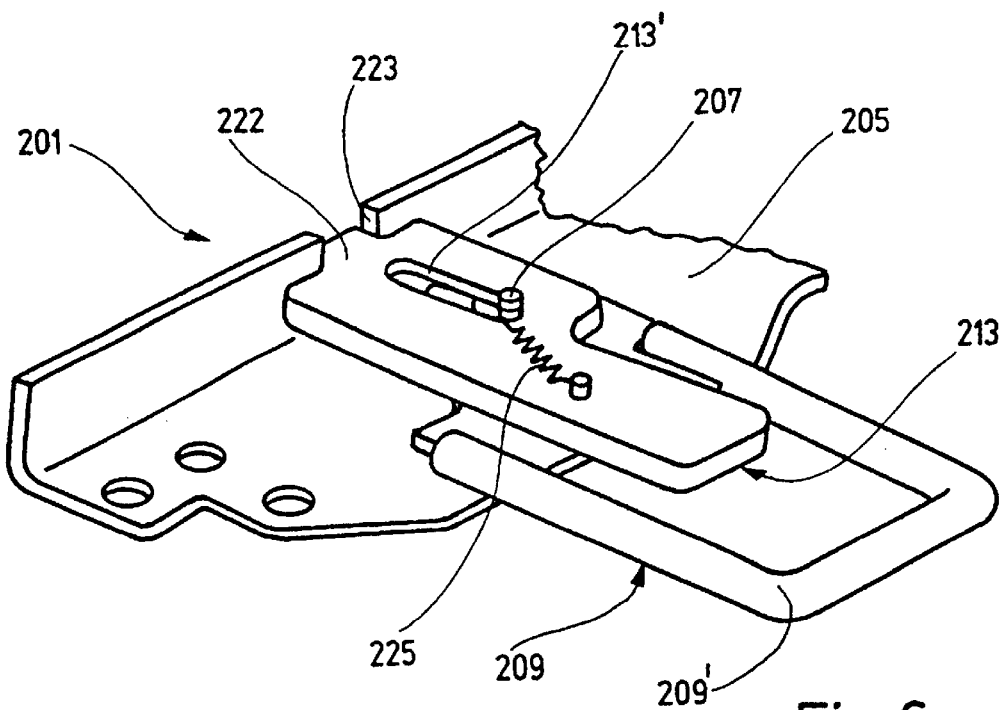
Fig. 6
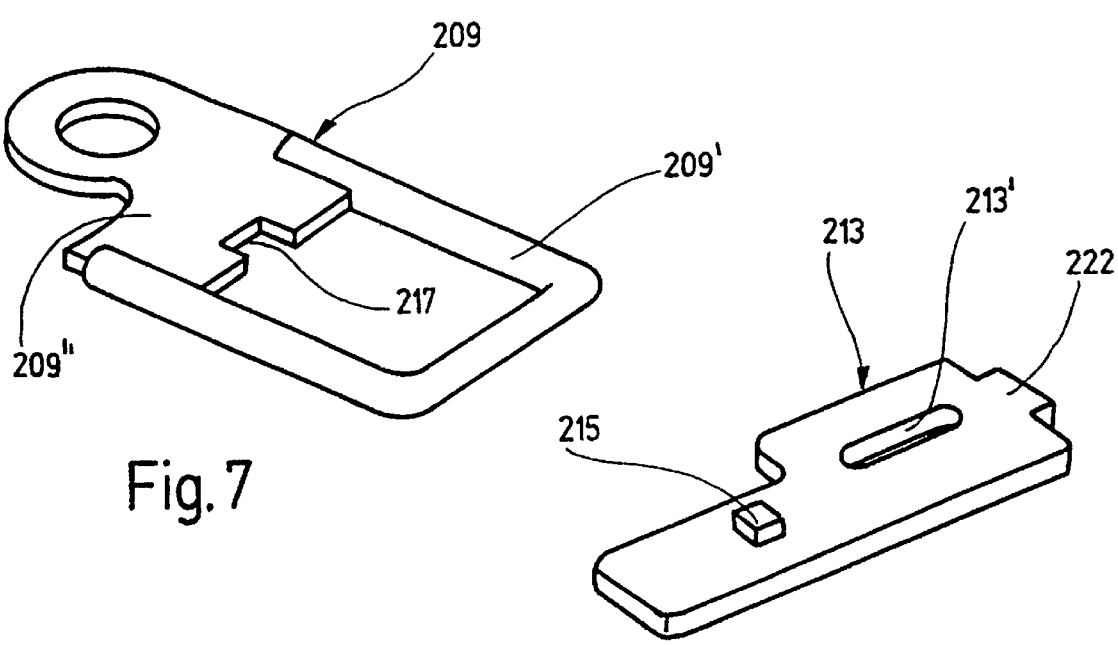
Fig. 7
Fig. 8

CHILD SEAT FIXING DEVICE

The invention relates to a fastening device for a child's seat on a vehicle seat, having the features of the precharacterizing clause of claim 1, and a vehicle seat having the features of the precharacterizing clause of claim 12.

DE 197 38802 C1 discloses a fastening device of this type in which the fastening element is held in its operational position by the force of a spring. The invention is based on the object of improving a fastening device of the type mentioned at the beginning. According to the invention, this object is achieved by a fastening device having the features of claim 1 and by a vehicle seat having the features of claim 12. Advantageous refinements are the subject matter of the dependent claims.

The provision of an interlocking element which is formed separately and which locks the fastening element in the operational position means that the operational position can be stressed by higher forces than in the case of the known fastening device. This is advantageous particularly when installing the child's seat if only one hand is available or if the child's seat is placed in a somewhat sloping position for installation. The fastening element, two parts of which are generally provided for each child's seat which is to be fastened, is preferably mounted pivotably on a crosspiece fixed to the seat structure or vehicle structure. The interlocking element is preferably of movable design, for example is pivotable, and then locks the fastening element relative to the crosspiece. The direction of action of the interlocking element may lie in the pivoting plane of the fastening element or perpendicularly thereto.

In a preferred fastening device the interlocking element locks with a form fit in order to be able to absorb relatively high forces. To assist the transfer into the locked position and as a means of ensuring that it remains in this position, the interlocking element may be spring-loaded towards this position. For unlocking of the interlocking element a release lever or an actuating handle is preferably provided.

In a preferred embodiment, the interlocking element can be displaced relative to the crosspiece and to the fastening element and locks these parts to each other. In a further preferred embodiment, the interlocking element is arranged on the fastening element, i.e. is attached in a suitable manner, for example is arranged co-rotationally, as a joint bearing or is connected in some other way, the interlocking element then likewise interacting with the crosspiece for locking purposes. The interlocking element may be arranged, for example, on a latching spring or a leaf spring. In the preferred embodiments which are mentioned, the fastening element carries along the interlocking element as it pivots into the parking position (and back). The interlocking element according to the invention may form a prefabricated subassembly together with the fastening element, which simplifies the production and makes it less expensive as a result. However, the interlocking element may also be attached, for example coupled, to the crosspiece.

For secure locking it is advantageous if the interlocking element has a projection which interacts with a socket in the fastening element or in the crosspiece and grips into the said socket during locking. The projection and the socket may also be formed on the other component in each case.

In the case of the interlocking element arranged on the fastening element, possibly subsequently desirable fitting or removal of the fastening element is simplified. The crosspiece, which then, for example, has the socket, which can be produced in a simple manner, for the interlocking element, may also be fitted initially without fastening elements, but at the same time may be prepared for optional attachment of the fastening elements if required. The invention can be supplemented to the effect that one and the same interlocking element can be effective both in the operational position and in the parking position.

A vehicle seat according to the invention, in particular a motor-vehicle seat, for example a rear-seat bench, has a fastening device according to the invention between the backrest and the seat cushion, which fastening device can be attached fixedly to the seat structure or the vehicle structure. The invention may also be used in seats for airline passengers.

Figure 2:
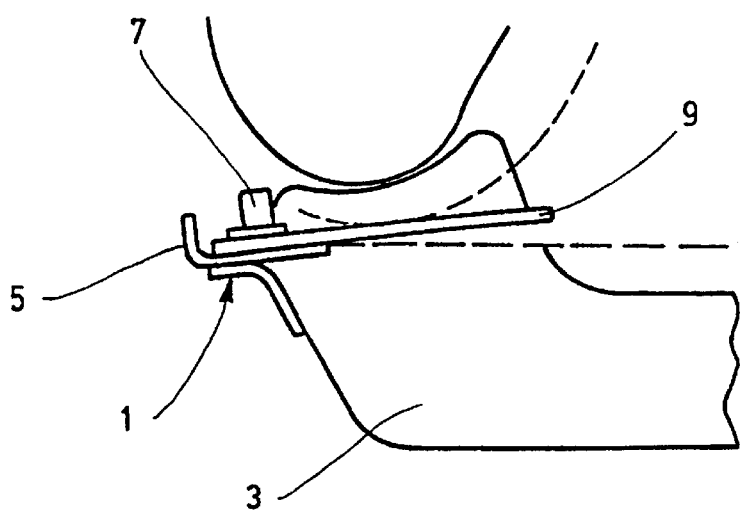
Figure 3:
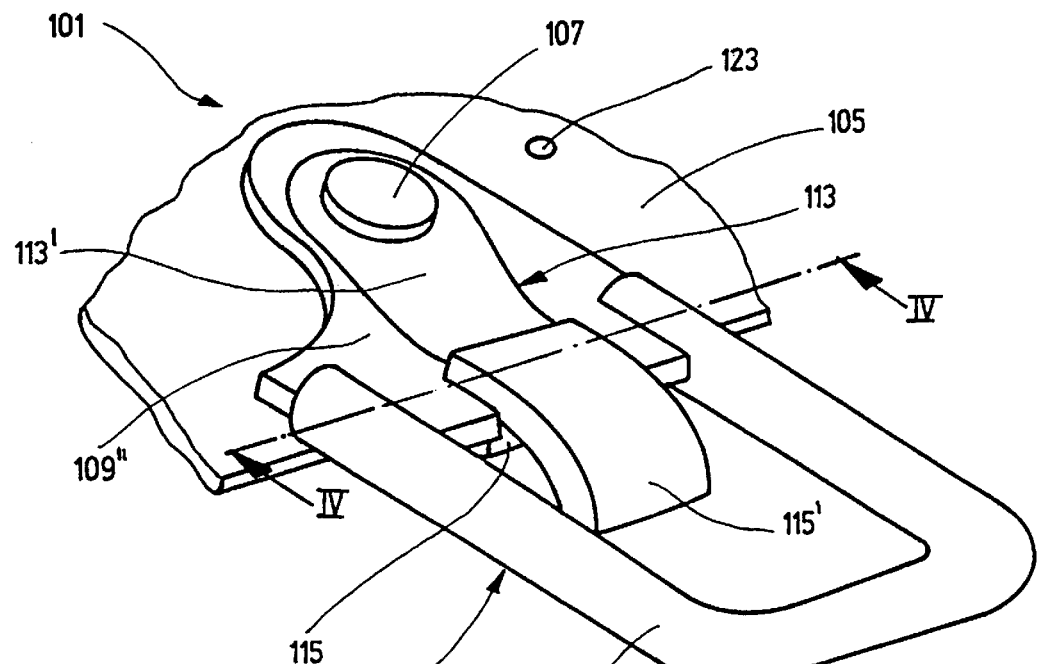
Figure 4:
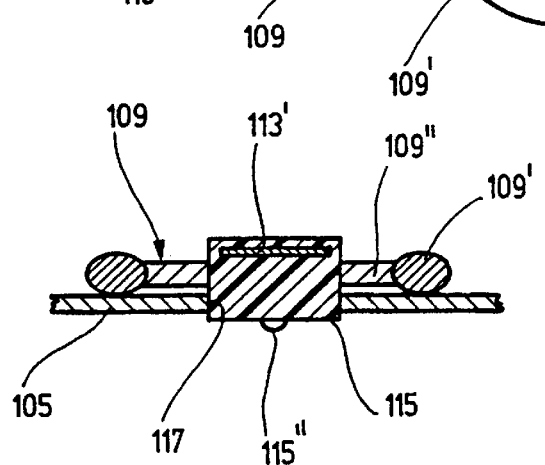
Figure 5:
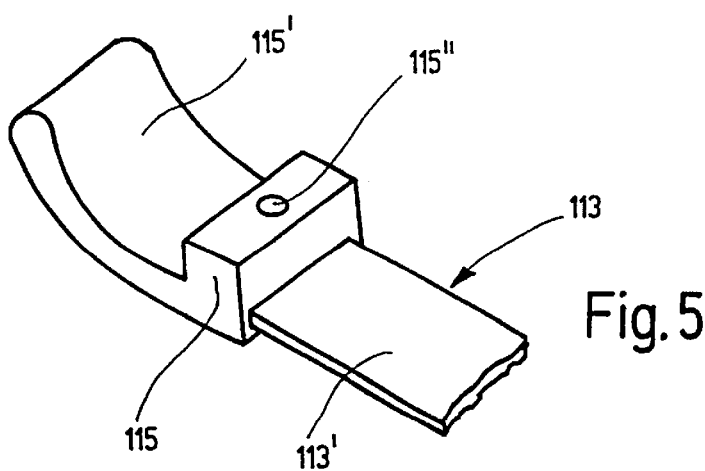
Figure 9:
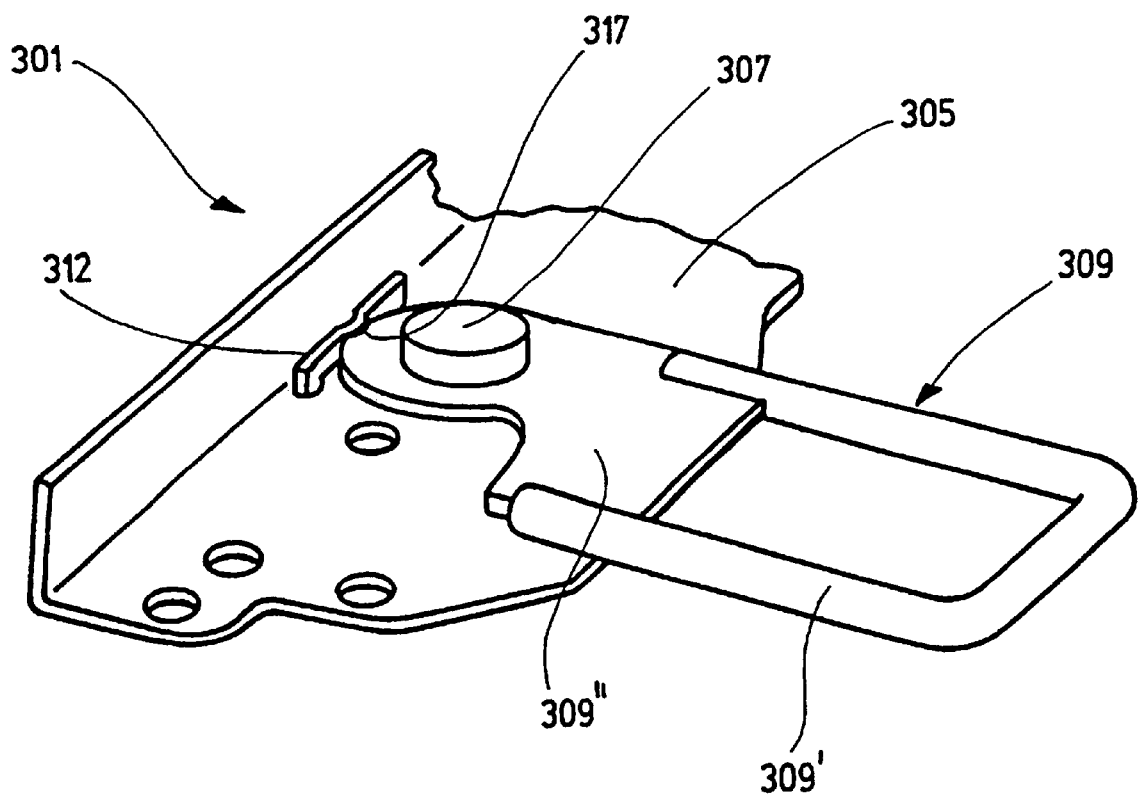
Figure 10:
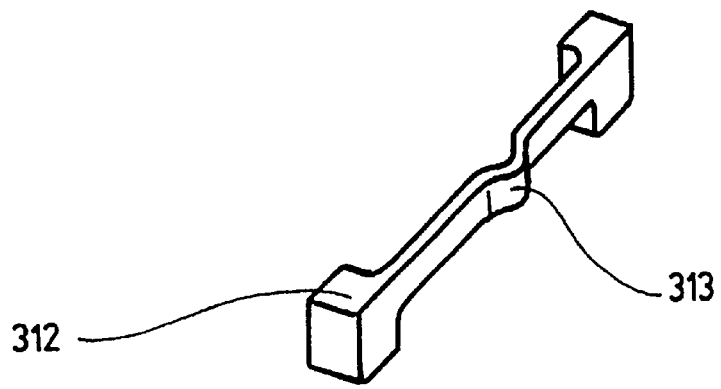
Figure 11:
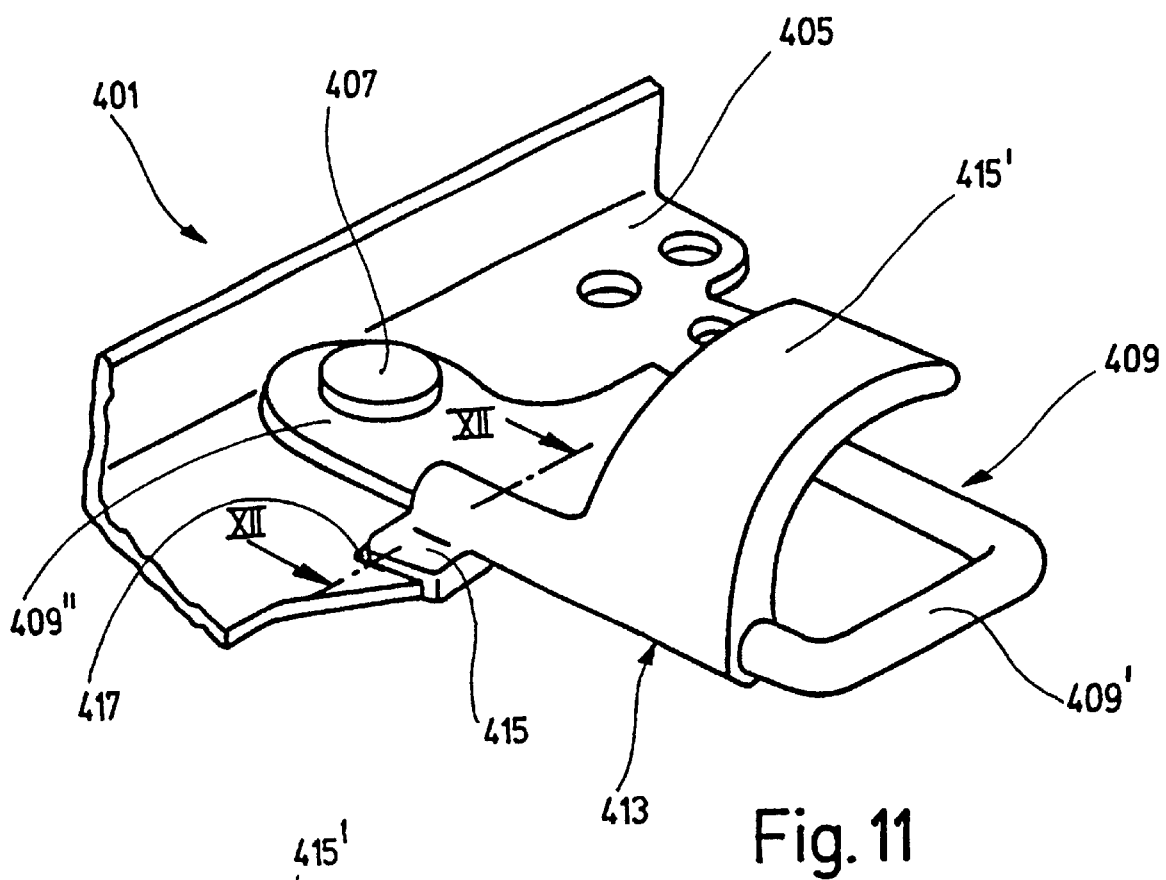
Figure 12:
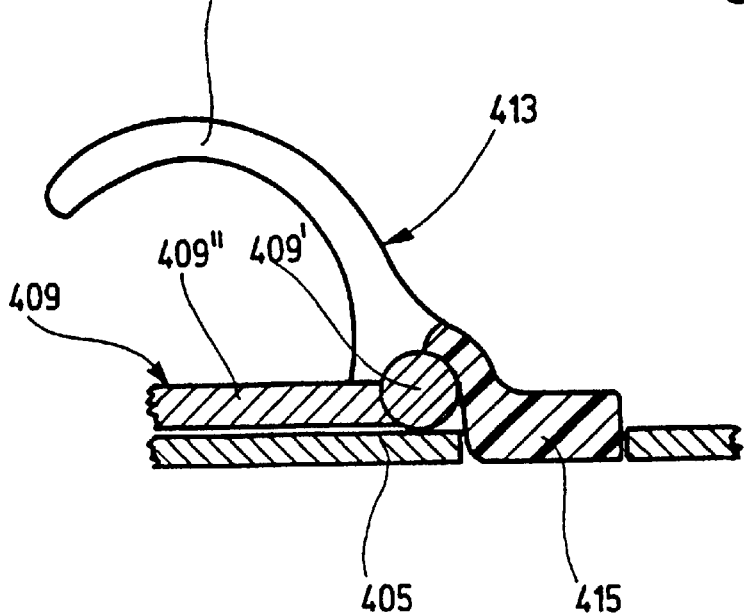
Figure 13:
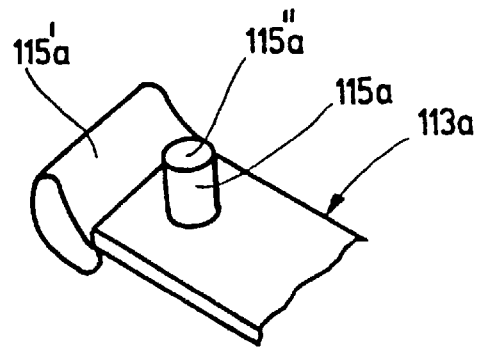
Figure 14:
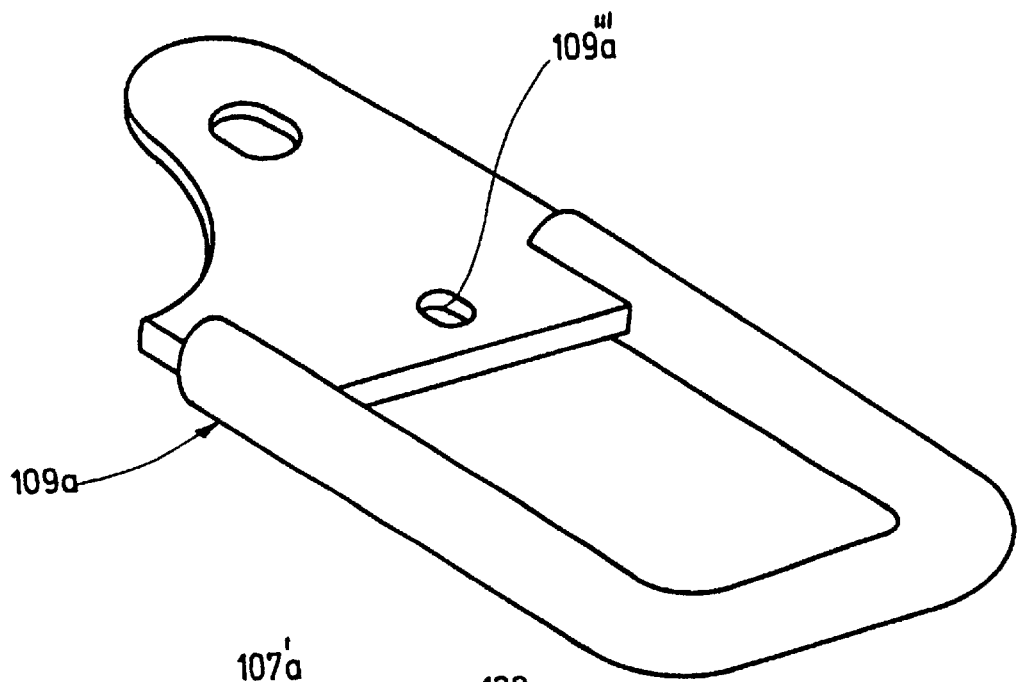
Figure 15:
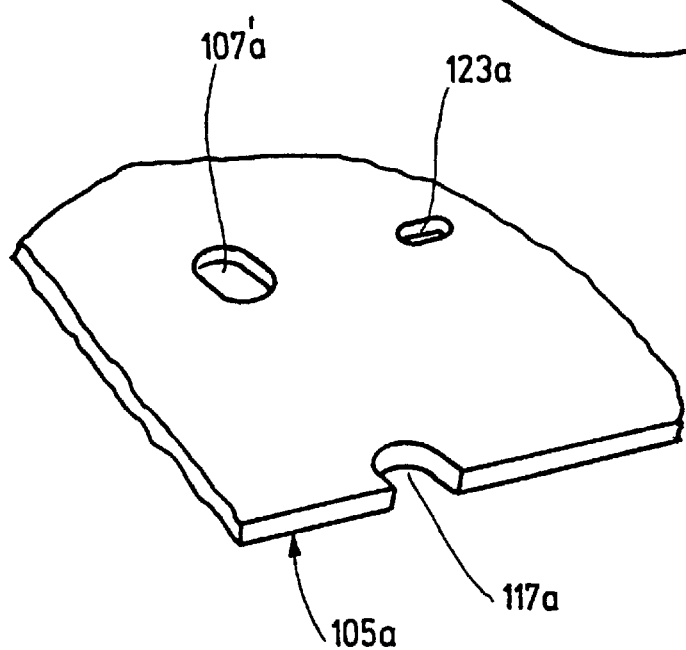
Figure 16:
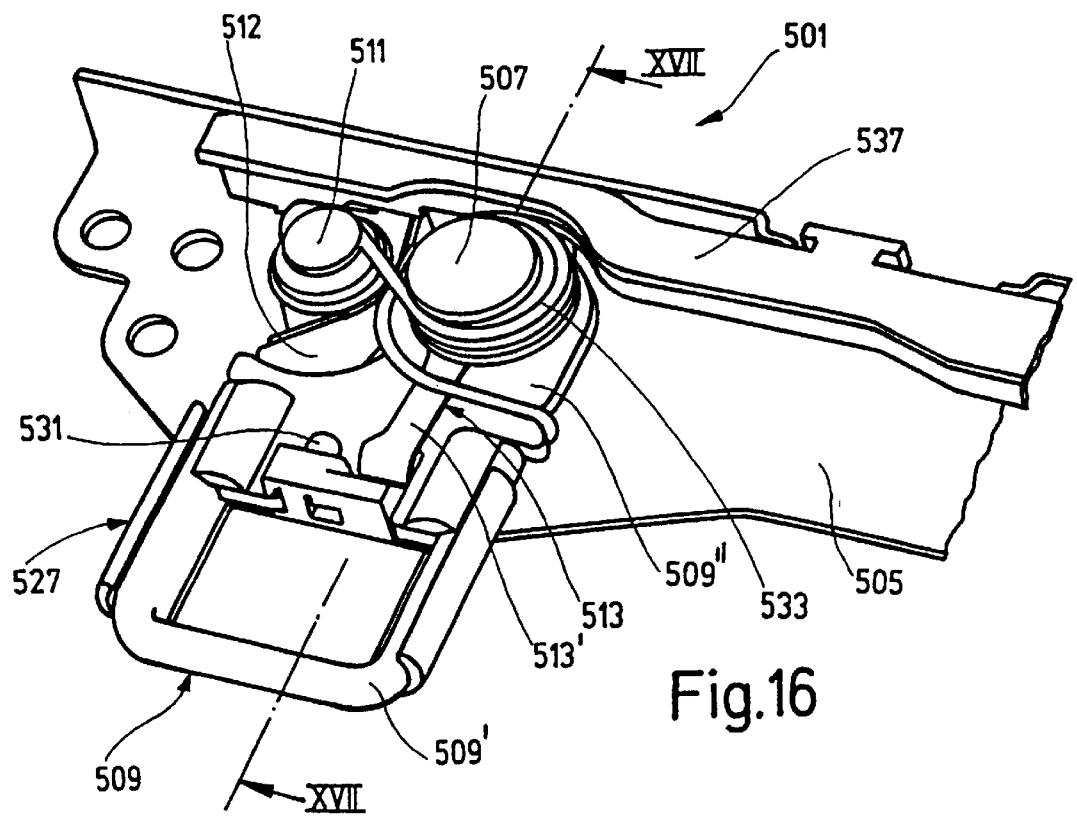
Figure 17:
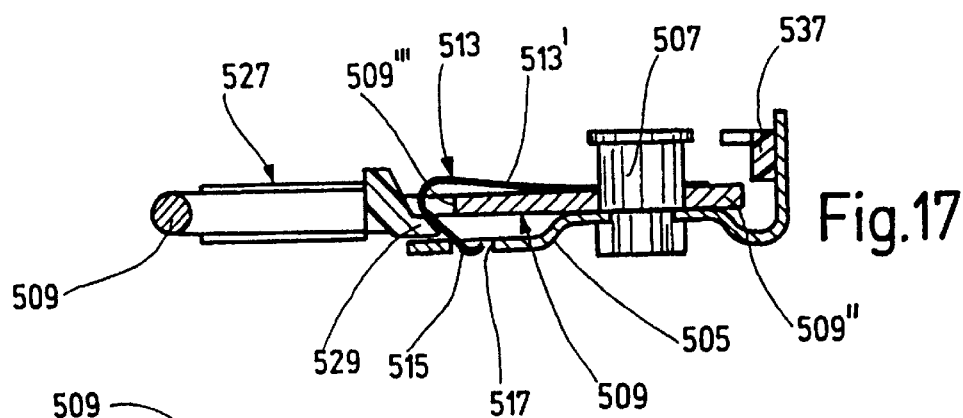
Figure 18:
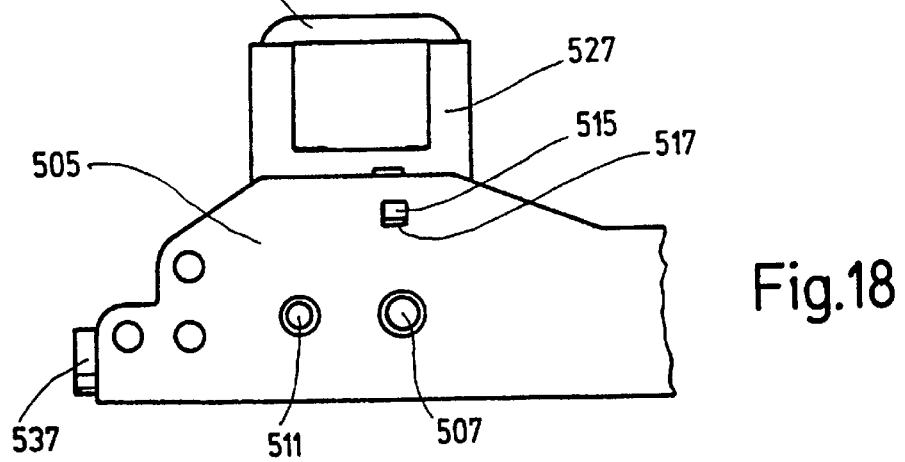
Figure 19:
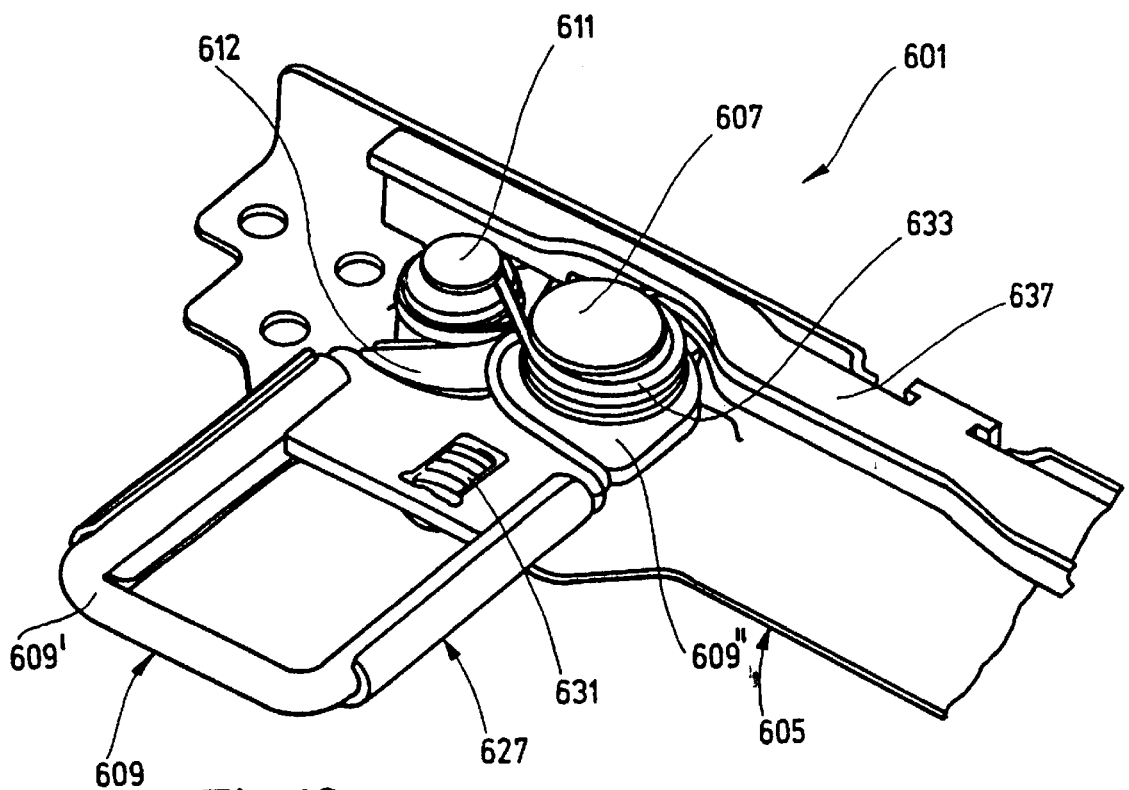
Figure 20:
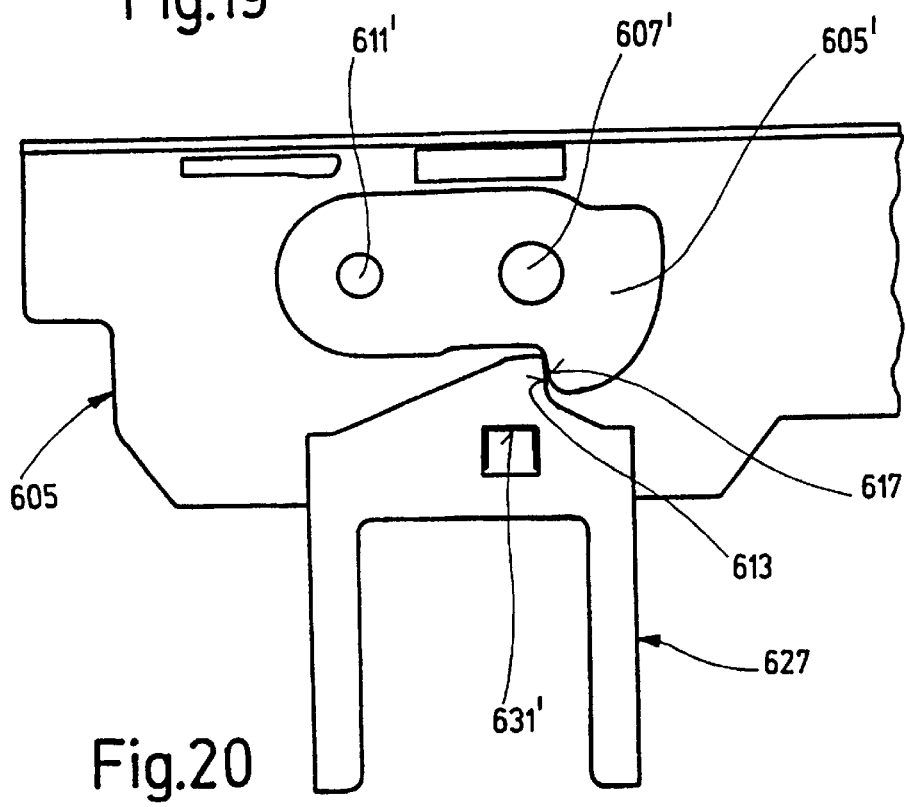

In the following, the invention is explained in greater detail with reference to five exemplary embodiments which are illustrated in the drawing, in which FIG. 1 shows a perspective view of the first exemplary embodiment in the region of the right-hand fastening element, FIG. 2 shows a schematic side view of the vehicle seat having a fastening device according to the invention, in which the upholstery is merely outlined, FIG. 3 shows a perspective view of the second exemplary embodiment in the region of the right-hand fastening element, FIG. 4 shows a section along the line IV—IV in FIG. 3, FIG. 5 shows a perspective partial view of the lower side of the interlocking element of FIG. 3, FIG. 6 shows a perspective view of the third exemplary embodiment in the region of the right-hand fastening element, FIG. 7 shows a perspective view of the fastening element of FIG. 6, FIG. 8 shows a perspective view of the lower side of the interlocking element of FIG. 6, FIG. 9 shows a perspective view of the fourth exemplary embodiment in the region of the right-hand fastening element, FIG. 10 shows an enlarged illustration of the latching spring in FIG. 9, FIG. 11 shows a perspective view of the fifth exemplary embodiment in the region of the left-hand fastening element, FIG. 12 shows a section along the line XII—XII in FIG. 11, FIG. 13 shows a perspective partial view of the lower side of an interlocking element of the sixth exemplary embodiment, FIG. 14 shows a perspective view of a fastening element of the sixth exemplary embodiment, FIG. 15 shows a perspective partial view of the crosspiece of the sixth exemplary embodiment, FIG. 16 shows a perspective view of the seventh exemplary embodiment in the region of the right-hand fastening element, FIG. 17 shows a section along the line XVII—XVII in FIG. 16, FIG. 18 shows a view from below of the part illustrated in FIG. 16, FIG. 19 shows a perspective view of the eighth exemplary embodiment in the region of the right-hand fastening element, and FIG. 20 shows a plan view of a slide and of the crosspiece of the eighth exemplary embodiment in the region of the right-hand fastening element.

In the first exemplary embodiment, in the case of a fastening device 1 for a motor-vehicle seat 3, a crosspiece 5 running approximately horizontally is fastened between the two sides of the motor-vehicle seat 3 in the region between the seat cushion and backrest, for example between the mountings. A respective first bearing journal 7 is fitted on the crosspiece 5 at a certain distance from the sides of the motor-vehicle seat 3. A fastening element 9, which can be pivoted in an approximately horizontal plane, is mounted rotatably on each of the two first bearing journals 7.

The two fastening elements 9 are of mirror-symmetrical design. Each fastening element 9 comprises a hoop-shaped part 9', which interacts with a connector of a child's seat (not illustrated) in order to fasten the latter on the motor-vehicle seat 3, and a tab-shaped part 9" which surrounds the first bearing journal 7. In the operational position of the two fastening elements 9, the hoop-shaped parts 9 protrude forwards in the direction of travel, whereas in the parking position the fastening elements 9 are pivoted parallel to the crosspiece 5, with the result that the hoop-shaped parts 9' point towards each other.

Fitted on the crosspiece 5, parallel to each first bearing journal 7, is a respective second bearing journal 11 on which an interlocking element 13, which can be pivoted in the same plane as the fastening element 9, is mounted rotatably. Each interlocking element 13 is pretensioned towards the associated fastening element 9 by means of a spring (not illustrated). Each interlocking element 13 has a hook 15 which points towards the fastening element 9. Each tab-shaped part 9" of the fastening element 9 has a socket 17 which points towards the interlocking element 13, in the operational position of the fastening element 9, and the hook 15 then engages in a form-fitting manner in it. The fastening element 9 is thereby locked in the operational position. The dimensioning of the parts is preferably selected in such a manner that in the operational position the fastening device 1 withstands forces of preferably 100 N. During the pivoting into the operational position the pretensioning of the interlocking element 13 ensures that the hook 15 engages in the socket 17.

For the purpose of unlocking the fastening element 9, a release lever 19 is mounted on the tab-shaped part 9" of the said fastening element, the said release lever being pivotable parallel to the pivoting plane of the fastening element 9. A pivoting movement, for example initiated manually, causes the release lever 19 to bear against a journal 21 which protrudes upwards parallel to the second bearing journal 11 from the interlocking element 13. Continuation of the pivoting movement causes the release lever 19 to carry along the journal 21 and therefore the interlocking element 13 with it, counter to the pretensioning. As a result, the hook 15 is withdrawn from the socket 17 and releases the fastening element 9 which can be pivoted into the parking position. A further socket for the hook 15 may be provided on the tab-shaped part 9" so as to secure the parking position.

In the second exemplary embodiment, in the case of a fastening device 101, two bearing journals 107 are likewise fitted on a crosspiece 105. Mounted pivotably on each of the two bearing journals 107 is a fastening element 109 which has virtually the same structure, with a hoop-shaped part 109' and a tab-shaped part 109", and the same functions as the one in the first exemplary embodiment.

Furthermore, on each bearing journal 107 there is arranged an interlocking element 113 which is connected in this region to the fastening element 109. The interlocking element 113 has a leaf spring 113' which extends in the center of the fastening element 109 between the bearing journal 107 and the edge region of the tab-shaped part 109" lying between the attachment pieces of the hoop-shaped part 109'. At the last-mentioned end, an approximately cuboid latching block 115 made of plastic is fastened on the leaf spring 113' and an actuating handle 115' is integrally formed on it, on the side which faces away from the leaf spring 113'. A bump 115" is provided on the lower side of the latching block 115.

The interlocking element 113 grips with its latching block 115 through a rectangular recess of the tab-shaped part 109". In the operational position, the interlocking element 113 simultaneously grips with the latching block 115 in a form-fitting manner through a socket 117 in the crosspiece 105, which socket is arranged under it and is likewise rectangular. The fastening element 109 is thereby locked. During the transfer into the operational position, the force of the leaf spring 113' causes the latching block 115 to take up the described position within the socket 117 without further assistance. The form fit means that in the operational position the fastening element 109 can be stressed with preferably 100 N.

For unlocking purposes, the latching block 115 can be raised via the actuating handle 115' and lifted out of the socket 117. The fastening element 109 can then be pivoted into the parking position. Provided in the crosspiece 105 is a depression 123 into which the bump 115" on the lower side of the latching block 115 grips when the parking position is reached. The fastening element 109 is therefore also secured in the parking position.

In the third exemplary embodiment, in the case of a fastening device 201, two bearing journals 207 are mounted rotatably on a crosspiece 205. Attached on each of the two bearing journals 207 is a fastening element 209 which has virtually the same structure, with a hoop-shaped part 209' and a tab-shaped part 209", and the same functions, as the one in the first exemplary embodiment.

The top of each bearing journal 207 has an end section having a smaller cross section. A flat interlocking element 213, which rests on the fastening element 209, surrounds this end section of the bearing journal 207 by means of an elongated hole 213'. The elongated hole 213' is aligned perpendicularly with respect to the crosspiece 205 and has a greater length than the end section of the bearing journal 207. As a result, the interlocking element 213 can be moved perpendicularly with respect to the crosspiece 205.

On its lower side the interlocking element 213 has a latching block 215 which, in the operational position of the fastening element 209, grips in a form-fitting manner into a socket 217 formed on the tab-shaped part 209" of the said fastening element. At its end facing to the rear the interlocking element 213 has a projection 222 which, in the operational position of the fastening element 209, grips in a form-fitting manner into a recess or depression 223 formed on the raised-up edge of the crosspiece 205. A tension spring 225 between the interlocking element 213 and the bearing journal 207 ensures that the projection 222 is held in the depression 223. The locking arrangement can likewise be stressed with preferably 100 N.

For unlocking purposes, the interlocking element 213 is grasped at its front end, which protrudes between the hoop-shaped part 209' of the fastening element 209, and is pulled forwards. The projection 222 leaves the depression 223 counter to the force of the tension spring 225. The socket 217 is of such a length that the latching block 215 is unable to leave the socket 217 during this process. The fastening element 209 can then be pivoted together with the interlocking element 213 to the side into the parking position.

In a modified embodiment of this, the bearing journal 207 is connected fixedly to the crosspiece 205. The fastening element 209 and the interlocking element 213 are then mounted rotatably on the bearing journal 207. The spring 225 is placed with its one end loosely around the end section of the bearing journal 207, with the result that this end can be rotated relative to the bearing journal 207.

In the fourth exemplary embodiment, in the case of a fastening device 301, two bearing journals 307 are likewise fitted on a crosspiece 305. Mounted pivotably on each of the two bearing journals 307 is a fastening element 309 which has virtually the same structure, with a hoop-shaped part 309' and a tab-shaped part 309", and the same functions as the structure in the first exemplary embodiment.

Arranged along the crosspiece 305, and supported on its raised-up edge, is a latching spring 312 which has a latching lug 313, which protrudes slightly forwards and acts as the interlocking element, in its center. The tab-shaped part 309" has a socket 317 at its end which faces away from the hoop-shaped part 309'. If the fastening element 309 is situated in its operational position the socket 317 points to the rear. The latching lug 313 then grips into the socket 317 and locks the fastening element 309 as a result.

For unlocking purposes, the fastening element 309 is pressed to the side. As a result, the latching lug 313 is pressed out of the socket 317 and the latching spring 312 releases the fastening element 309. The fastening element 309 has, offset by 90° with respect to the socket 317, a further socket which is concealed by the bearing journal 307 in the drawing. By means of this further socket, which interacts with the latching lug 313, the fastening element 309 is locked in its parking position.

In the fifth exemplary embodiment, in the case of a fastening device 401, two bearing journals 407 are likewise fitted on a crosspiece 405. Mounted pivotably on each of the two bearing journals 407 is a fastening element 409 which has virtually the same structure, with a hoop-shaped 409' and a tab-shaped part 409", and the same functions as the one in the first exemplary embodiment.

An interlocking element 413 is clipped onto the inner, lateral limb of the hoop-shaped part 409'. The interlocking element 413, which is manufactured as an injection-moulded plastic part, can be pivoted over a certain angular range, the limb of the hoop-shaped part 409' forming the pivot axis which is oriented in the longitudinal direction of the fastening element 409. At that end of the interlocking element 413 which faces the tab-shaped part 409" the said interlocking element has a latching block 415 which protrudes laterally from the fastening element 409. If the fastening element 409 is situated in the operational position the latching block 415 grips in a form-fitting manner into a socket 417 provided on the front edge of the crosspiece 405 and as a result locks the fastening element 409 up to a stress of preferably 100 N.

At the end facing away from the latching block 415 the interlocking element 413 has an upwardly protruding, curved actuating handle 415' which, on the side facing away from the latching block 415, bends towards the other limb of the hoop-shaped part 409'. The actuating handle 415' is held upwards by means of a spring (not illustrated) or by means of friction between the interlocking element 413 and the limb of the hoop-shaped part 409'. For unlocking purposes, the actuating handle 415' is pressed downwards, as a result of which the interlocking element 413 pivots about the limb of the hoop-shaped part 409'. As a result, the latching block 415 pivots upwards out of the socket 417 and releases the fastening element 409 for pivoting into the parking position.

The sixth exemplary embodiment is a modification of the second exemplary embodiment and so corresponding components bear a reference number supplemented by the letter "a". Components of the sixth exemplary embodiment which are not described in greater detail and their function coincide with those of the second exemplary embodiment. A crosspiece 105*a* has a socket 117*a* which is arranged, in the direction of travel, in front of a hole 107'*a* for a bearing journal and which is formed as a U-shaped incision on the front edge of the crosspiece 105*a*. Offset by 90° with respect to the hole 107'*a*, the crosspiece 105*a* has a slightly elongated depression 123*a* which may also be designed as an elongated hole penetrating the crosspiece 105*a*. A fastening element 109*a* having a hoop-shaped part and a tab-shaped part has in the tab-shaped part an elongated-hole-shaped recess 109'''*a* which is arranged above the socket 117*a* in the operational position. An interlocking element 113*a* having a leaf spring has on the lower side in the region of its free end, to which an actuating handle 115'*a* is attached, a downwardly protruding, cylindrical latching pin 115*a* having a spherically rounded edge 115"*a*.

For locking the fastening element 109*a* to the crosspiece 105*a* the latching pin 115*a* grips through the recess 109'''*a* into the socket 117*a*. During the transfer into the parking position, the latching pin 115*a* is lifted out of the socket 117*a*, but not out of the recess 109'''*a* whose edges are used as a stop for limiting the lifting-out movement of the latching pin 115*a*. When the parking position is reached, the latching pin 115*a* enters with its head 115"*a* into the depression 123*a* of the crosspiece 105*a*, the head 115"*a* preferably having a larger diameter than the depression 123*a* so that it can center itself.

The seventh exemplary embodiment relates to a fastening device 501 which is partially similar to the first and second exemplary embodiments, and so corresponding components bear reference numbers which are higher by 500 or by 400, respectively. Mounted pivotably on a crosspiece 505, by means of a first bearing journal 507 at each end, is a fastening element 509 which has a hoop-shaped part 509' and a tab-shaped part 509". A catch 512 is mounted pivotably on the crosspiece 505 by means of a second bearing journal 511. An interlocking element 513, which as in the second exemplary embodiment has a leaf spring 513', is attached by means of the first bearing journal 507 to the tab-shaped part 509", i.e. is arranged co-rotationally relative to the latter. The free end of the leaf spring 513' is designed as a spring hook 515 which initially grips through a U-shaped recess 509''' in the tab-shaped part 509" and then, in the operational position of the fastening element 509, into a socket 517 in the crosspiece 505. The socket 517 is designed as an opening of approximately square cross section which passes through the crosspiece 505 in such a manner that there is a form fit in the horizontal.

A slide 527 is arranged on the fastening element 509 in a manner such that it can be displaced in the longitudinal direction thereof, i.e. towards the first bearing journal 507 and away from the latter. The slide 527 is preferably guided by virtue of it at least partially surrounding the legs of the hoop-shaped part 509', which point in the longitudinal direction. The slide 527 has a wedge 529 which is arranged within the recess 509'''. Starting from the operational position, in the event of a movement of the slide 527, which is caused by pressing by the user, towards the first bearing journal 507, the wedge 529 is pressed against the spring hook 515. The spring hook 515 is pressed upwards via the obliquely upwardly pointing wedge surface of the wedge 529, so that the spring hook 515 leaves the socket 517, as a result of which the fastening element 509 is unlocked. A compression spring 531 between the tab-shaped part 509" and the slide 527 ensures that the wedge 529 does not press onto the spring hook 515 without external force action.

A pretensioning spring 533 which is coiled around the first bearing journal 507 stresses the fastening element 509, with the result that the latter pivots out of the parking position into the operational position. In its further extent the pretensioning spring 533 is coiled around the second bearing journal 511 and clamps the catch 512 towards the fastening element 509. In the parking position, as indicated in the first exemplary embodiment, the catch 512 grips into a corresponding socket in the fastening element 509. By means of an unlocking bar 537 the two catches 512 at both ends of the crosspiece 505 can be pivoted in such a manner that they release the associated fastening elements 509. Each fastening element 509 then pivots into the operational position because of the force of the pretensioning spring 533, where the spring hook 515 of the interlocking element 513 grips because of its spring force into the socket 517 in the crosspiece 505 and locks the fastening element 509.

The eighth exemplary embodiment relates to a fastening device 601 which is largely similar to the seventh exemplary embodiment and so corresponding components bear reference numbers which are higher by 100. An island 605' is formed at each end of a crosspiece 605. Each island 605' has a hole 607' for a first bearing journal 607 which is used for the pivotable mounting of a fastening element 609 which has a hoop-shaped part 609' and a tab-shaped part 609". The island 605' also has a hole 611' for a second bearing journal 611 used to pivotably mount a catch 612 on the crosspiece 605. A lug-shaped interlocking element 613, which in the operational position interacts with a step-shaped socket 617 in the island 605', is formed on a slide 627. The slide 627 is arranged on the fastening element 609 in a manner such that it can be displaced in the longitudinal direction thereof, i.e. towards the first bearing journal 607 and away from the latter. The slide 627 is preferably guided by virtue of the fact that it at least partially surrounds the limbs of the bracket-shaped part 609', which point in the longitudinal direction.

A compression spring 631 between the tab-shaped part 609" and the slide 627 ensures that the slide 627 is pretensioned towards the island 605'. The compression spring 631 is held by a corresponding, cage-shaped mount 631' of the slide 627. In the operational position, the form-fitting bearing of the tab-shaped part 609" against the catch 612 prevents pivoting outwards, while the form-fitting bearing of the interlocking element 613 against the step-shaped flank of the socket 617 in the island 605' of the crosspiece 605 prevents pivoting inwards into the parking position. For unlocking purposes, the slide 627 is pulled forwards counter to the force of the compression spring 631 until the interlocking element 613 leaves the socket 617 and the user can pivot the fastening element 609 inwards.

A pretensioning spring 633 which is coiled around the first bearing journal 607 stresses the fastening element 609, with the result that the latter pivots out of the parking position into the operational position. In its further extent the pretensioning spring 633 is coiled around the second bearing journal 611 and clamps the catch 612 towards the fastening element 609. In the parking position, the catch 612 grips into a corresponding socket in the fastening element 609. By means of an unlocking bar 637 the two catches 612 at both ends of the crosspiece 605 can be pivoted in such a manner that they release the associated fastening elements 609. Each fastening element 609 then pivots into the operational position because of the force of the pretensioning spring 633, where the interlocking element 613 grips into the socket 617 in the crosspiece 605 because of the spring force of the compression spring 631 and locks the fastening element 609.

If not described differently above, the exemplary embodiments correspond with regard to their features and properties.

What is claimed is:

1. A fastening device for fastening a child's seat on a vehicle seat of a vehicle, comprising:
  a crosspiece of a vehicle seat structure or a vehicle structure;
  at least one fastening element pivotably mounted to the crosspiece for pivoting relative to the crosspiece between an operational position and a parked position, wherein a bearing journal pivotably mounts the fastening element to the crosspiece, and wherein the fastening element includes:
    a tab-shaped part defining hole through which the bearing journal extends, and
    an at least generally hoop-shaped part for interacting with a connector of the child's seat, wherein the hoop-shaped part is mounted to, and contiguous with, the tab-shaped part; and
  an interlocking element pivotably mounted to the crosspiece for engaging the fastening element and thereby releasably looking the fastening element to the crosspiece while the fastening element is in the operational position, so that movement of the fastening element from the operational position to the parked position is prevented while the interlocking element is locking the fastening element to the crosspiece.

2. A fastening device according to claim 1, wherein:
  the interlocking element is pivotably mounted to the crosspiece for moving between an interlocked configuration and an uninterlocked configuration,
  while the fastening element is in the operational position and the interlocking element is in the interlocked configuration, the interlocking element is interlocked with the fastening element so that movement of the fastening element from the operational position to the parked position is restricted,
  while the fastening element is in the operational position and the interlocking element is in the uninterlocked configuration, the interlocking element is not interlocked to the fastening element so that the fastening element can be moved out of the operational position, and
  the interlocking element is spring-biased toward the interlocked configuration.

3. A fastening device according to claim 1, wherein there is form-fit engagement between the interlocking element and the fastening element while the interlocking element is interlocked with the fastening element to releasably lock the fastening element in the operational position.

4. A fastening device according to claim 1, further comprising a release lever or an actuating handle for being moved to move the interlocking element out of an interlocked configuration in which the interlocking element is interlocked with the fastening, element to releasably lock the fastening element in the operational position, whereby the release lever or the actuating handle is for unlocking the fastening element from the crosspiece.

5. A fastening device according to claim 1, wherein the fastening element includes a socket, and the interlocking element includes a projection for engaging the socket for locking purposes.

6. A fastening device for fastening a child's seat on a vehicle seat of a vehicle, comprising;
  a crosspiece of a vehicle seat structure or a vehicle structure;
  at least one fastening element pivotably mounted to the crosspiece for pivoting relative to the crosspiece between an operational position and a parked position; and an interlocking element mounted to the fastening element for engaging the crosspiece and thereby releasably locking the fastening element to the crosspiece while the fastening element is in the operational position, so that movement of the fastening element from the operational position to the parked position is prevented while the interlocking element is locking the fastening element to the crosspiece.

7. A fastening device according to claim 6, wherein the interlocking element is mounted for being movable relative to both the crosspiece and the fastening element, and the interlocking element is for respectively interlocking with both the crosspiece and the fastening element to restrict movement of the fastening element relative to the crosspiece while He fastening element is in the operational position.

8. A fastening device according to claim 6, wherein the interlocking element includes a latching spring carrying a latching element such that the latching element is for engaging the crosspiece and thereby releasably locking the fastening element to the crosspiece while the fastening element is in the operational position, so that movement of the fastening element from the operational position to the parked position is prevented while the interlocking element is locking the fastening element to the crosspiece.

9. A fastening device according to claim 6, wherein a bearing journal pivotably mounts the fastening element to the crosspiece, and wherein the fastening element includes:
   a tab-shaped part defining hole through which the bearing journal extends, and
   an at least generally hoop-shaped part for interacting with a connector of the child's seat, wherein the hoop-shaped part is mounted to, and contiguous with, the tab-shaped part.

10. A fastening device according to claim 6, wherein:
   the interlocking element is mounted for moving between an interlocked configuration and an uninterlocked configuration,
   while the fastening element is in the operational position and the interlocking element is in the interlocked configuration, the interlocking element is interlocked with the crosspiece so that movement of the fastening element from the operational position to the parked position is restricted,
   while the fastening element is in the operational position and the interlocking element is in the uninterlocked configuration, the interlocking element is not interlocked to the crosspiece so that the fastening element can be moved out of the operational position, and
   the interlocking element is spring-biased toward the interlocked configuration while the fastening element is in the operational position.

11. A fastening device according to claim 6, wherein there is form-fit engagement between the interlocking element and the crosspiece while the interlocking element is interlocked with the crosspiece to releasably lock the fastening element in the operational position.

12. A fastening device according to claim 6, further comprising a release lever or an actuating handle for being moved to move the interlocking element out of an interlocked configuration in which the interlocking element is interlocked with the crosspiece to releasably lock the fastening element in the operational position, whereby the release lever or the actuating handle is for unlocking the fastening element from the crosspiece.

13. A fastening device according to claim 6, wherein the crosspiece includes a socket, and the interlocking element includes a projection for engaging the socket for locking purposes.

14. A fastening device according to claim 6, wherein:
   as a result of the interlocking element being mounted to tie fastening element, the interlocking element moves with the fastening element while the fastening element is moved between the operational and parked positions;
   a bearing journal pivotably mounts the fastening element to the crosspiece; and
   the interlocking element is mounted to the fastening element at least partially as a result of the interlocking element being mounted on the bearing journal.

15. A fastening device according to claim 14, wherein the interlocking element comprises a spring and a latching pin, and wherein the latching pin can be moved by moving the spring.

16. A fastening device according to claim 15, wherein the interlocking element further comprises an actuating handle that is mounted to the spring for lifting latching pin.

17. A fastening device according to claim 15, wherein:
   it is the latching pin of the interlocking element that is for engaging the crosspiece to releasably lock the fastening element to the crosspiece while the fastening element is in the operational position, with the latching pin extending through an opening of the fastening element while the latching pin is engaging the crosspiece to releasably lock the fastening element to the crosspiece while the fastening element is in the operational position, and
   the latching pin can be disengaged from the crosspiece by moving the spring, so that the fastening element can be moved from the operational position to the parked position.

18. A fastening device for fastening a child's seat on a vehicle seat of a vehicle, comprising:
   a crosspiece of a vehicle seat structure or a vehicle structure;
   at least one fastening element pivotably mounted to the crosspiece for pivoting relative to the crosspiece between an operational position and a parked position; and
   an interlocking element substantially non-movably mounted to the crosspiece for engaging the fastening element and thereby releasably locking the fastening element to the crosspiece while the fastening element is in the operational position, so that movement of the fastening element from the operational position to the parked position is prevented while the interlocking element is locking the fastening element to the crosspiece.

19. A fastening device according to claim 18, wherein there is force-fit engagement between the interlocking element and the fastening element while the interlocking element is interlocked with the fastening element to releasably lock the fastening element in the operational position.

20. A fastening device according to claim 18, wherein a bearing journal pivotably mounts the fastening element to the crosspiece, and wherein the fastening element includes:
   a tab-shaped part defining hole through which the bearing journal extends, and
   an at least generally hoop-shaped part for interacting with a connector of the child's seat, wherein the hoop-shaped part is mounted to, and contiguous with, the tab-shaped par.

21. A fastening device according to claim 18, wherein:
   the interlocking element includes a latching lug that is movable between an uninterlocked position and an interlocked position,
   the latching lug is spring-biased toward the interlocked position so that:

while the fastening element is in the operational position and the interlocking element is in the interlocked position, the latching lug is interlocked with the fastening element so that movement of the fastening element from the operational position to the parked position is restricted, and the latching lug can be moved to the uninterlocked position by overcoming the spring-bias, so that the fastening element can be moved from the operational position to the parked position.

22. A fastening device according to claim 18, wherein there is form-fit engagement between the interlocking element and the fastening element while the interlocking element is interlocked with the fastening element to releasably lock the fastening element in the operational position.

23. A fastening device according to claim 18, wherein the interlocking element includes a latching spring carrying a latching element such that the latching element is for engaging the fastening element and thereby releasably locking the fastening element to the crosspiece while the fastening element is in the operational position, so that movement of the fastening element from the operational position to the parked position is prevented while the interlocking element is locking the fastening element to the crosspiece.

24. A fastening device according to claim 18, wherein the fastening element includes a socket, and the interlocking element includes a projection for engaging the socket for locking purposes.

* * * * *

UNITED STATES PATENT AND TRADEMARK OFFICE
CERTIFICATE OF CORRECTION

PATENT NO. : 6,631,958 B1
DATED : October 14, 2003
INVENTOR(S) : Herrmann et al.

It is certified that error appears in the above-identified patent and that said Letters Patent is hereby corrected as shown below:

<u>Title page,</u>
Item [57], ABSTRACT, should read:
-- In a fastening device for fastening a child's seat on a vehicle seat, in particular on a motor-vehicle seat, having at least one fastening element which can be moved between an operational position and a parking position and which can be secured in the operational position, an interlocking element is provided which locks the fastening element in the operational position. --

<u>Column 1,</u>
Line 2, after the title of the invention, insert:
-- BACKGROUND OF THE INVENTION --;
Lines 3-15, delete the paragraph beginning "The invention relates" through "matter of the dependent claims." and insert the following:
-- The present invention relates to a fastening device that is for fastening a child's seat on a vehicle seat and that includes a fastening element that can be moved relative to the vehicle seat between an operational and a parked position.

DE 197 38802 C1 discloses a fastening device of the above described kind and in which the fastening element is held in its operational position by the force of a spring. --
Line 16, before the paragraph beginning, "The provision of an", insert:
-- SUMMARY OF THE INVENTION --

<u>Column 2,</u>
Line 13, before the paragraph beginning, "In the following", insert:
-- BRIEF DESCRIPTION OF THE DRAWINGS --
Line 64, before the paragraph beginning, "In the first exemplary", insert:
-- DETAILED DESCRIPTION OF THE INVENTION --.

<u>Column 8,</u>
Line 22, "looking" should read -- locking --;
Line 52, after "fastening" cancel the comma ",";
Line 61, after "comprising" the semicolon ";" should be a colon -- : --.

<u>Column 9,</u>
Line 15, "He" should read -- the --.

UNITED STATES PATENT AND TRADEMARK OFFICE
CERTIFICATE OF CORRECTION

PATENT NO. : 6,631,958 B1
DATED : October 14, 2003
INVENTOR(S) : Herrmann et al.

It is certified that error appears in the above-identified patent and that said Letters Patent is hereby corrected as shown below:

Column 10,
Line 3, "tie" should read -- the --;
Line 17, after "lifting" insert -- the --;
Line 61, "par" should read -- part --.

Signed and Sealed this

Twenty-third Day of March, 2004

JON W. DUDAS
*Acting Director of the United States Patent and Trademark Office*